UNITED STATES PATENT OFFICE.

JOSEPH E. KESELING AND CHARLES FUCHS, JR., OF NEW YORK, N. Y., ASSIGNORS TO THE PYROLITH COMPANY, OF NEW JERSEY.

COMPOSITION OF MATTER FOR THE MANUFACTURE OF ARTIFICIAL STONE.

SPECIFICATION forming part of Letters Patent No. 481,279, dated August 23, 1892.

Application filed May 2, 1892. Serial No. 431,474. (No specimens.)

*To all whom it may concern:*

Be it known that we, JOSEPH E. KESELING, a subject of the Emperor of Germany, and CHARLES FUCHS, Jr., a citizen of the United States, each residing at New York, county and State of New York, have invented certain new and useful Improvements in a Composition of Matter for the Manufacture of Artificial Stone, of which the following is a specification.

Our invention relates to a composition of matter for the manufacture of artificial stone; and it consists of a basic cement of oxide of magnesium and neutral chloride of magnesium, to which is added sand, asphaltum, and albumen.

The various steps in the process of obtaining the basic cement are fully set out in an application for artificial-stone compositions, filed in the United States Patent Office April 30, 1892, Serial No. 431,340.

When articles of high elasticity are required, the asphaltum which enters therein is treated with oil of turpentine to form a solution. The sand and calcined magnesia enter in the proportion of twenty-five to thirty parts, by weight, of magnesia to seventy to seventy-five parts, by weight, of sand. In order that the above-stated amount of magnesia with a proper amount of chloride solution may fully take up all the sand and have a resultant plastic mass, we add to these materials a diluting liquid. This dilutant we obtain by dissolving albumen in water of 150° to 160° Fahrenheit.

Now to obtain the composition in a state ready for use, we mix together the sand, seventy-five per cent., (two hundred and twenty-five pounds,) and asphaltum solution, one-half gallon, with the basic cement, (seventy-five pounds magnesium oxide and five gallons magnesium chloride) and at the same time gradually pour in the albumen solution, three to four gallons. The above proportion of the several ingredients may be varied within certain limits up to ninety per cent. sand, depending upon the specific purpose of the composition. The composition may have mineral coloring-matter added thereto, and the produced article will preferably be subjected to a hot-water bath, as set forth in the application Serial No. 431,340, before referred to.

The sand is the cheapest element, and as we use seventy-five per cent. of it to twenty-five per cent. of the other elements it is apparent that we can obtain a stone product at a minimum cost.

Having thus described our invention, what we claim is—

A composition of matter for artificial stone, consisting of a basic cement of oxide and neutral chloride of magnesium, sand, or analogous material, asphaltum, and a solution of albumen.

In testimony whereof we have hereunto set our hands this 27th day of April, 1892.

JOSEPH E. KESELING.
CHARLES FUCHS, JR.

In presence of—
CHAS. A. RILEY,
WILLIAM MOLLOY.